July 7, 1959            C. H. CALLERY            2,893,642

APPARATUS FOR APPLYING BITUMEN COATING TO METALLIC SURFACES

Filed Feb. 8, 1956            8 Sheets-Sheet 1

Charles H. Callery
INVENTOR.

BY Cushman, Darby & Cushman
Attorneys

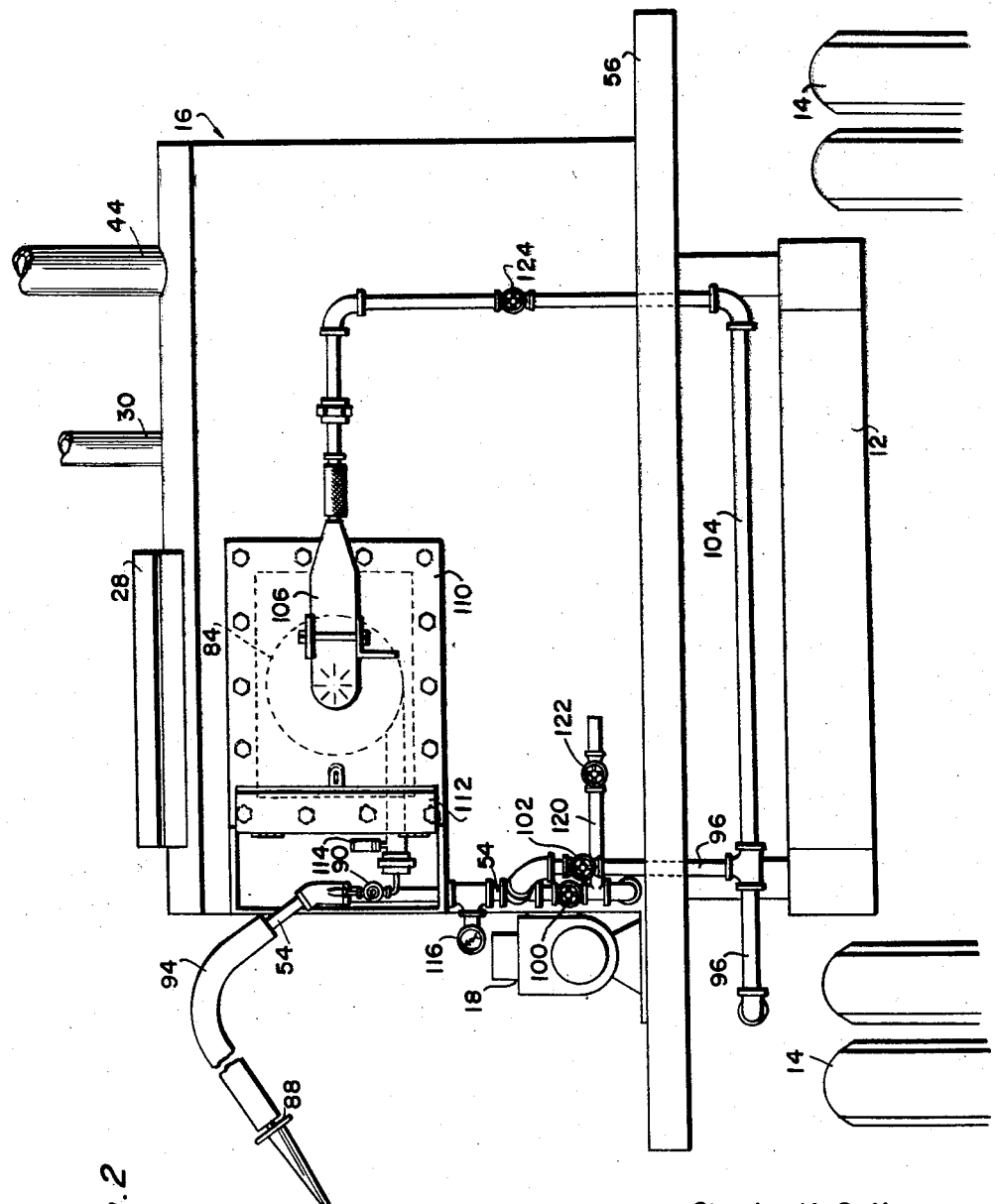

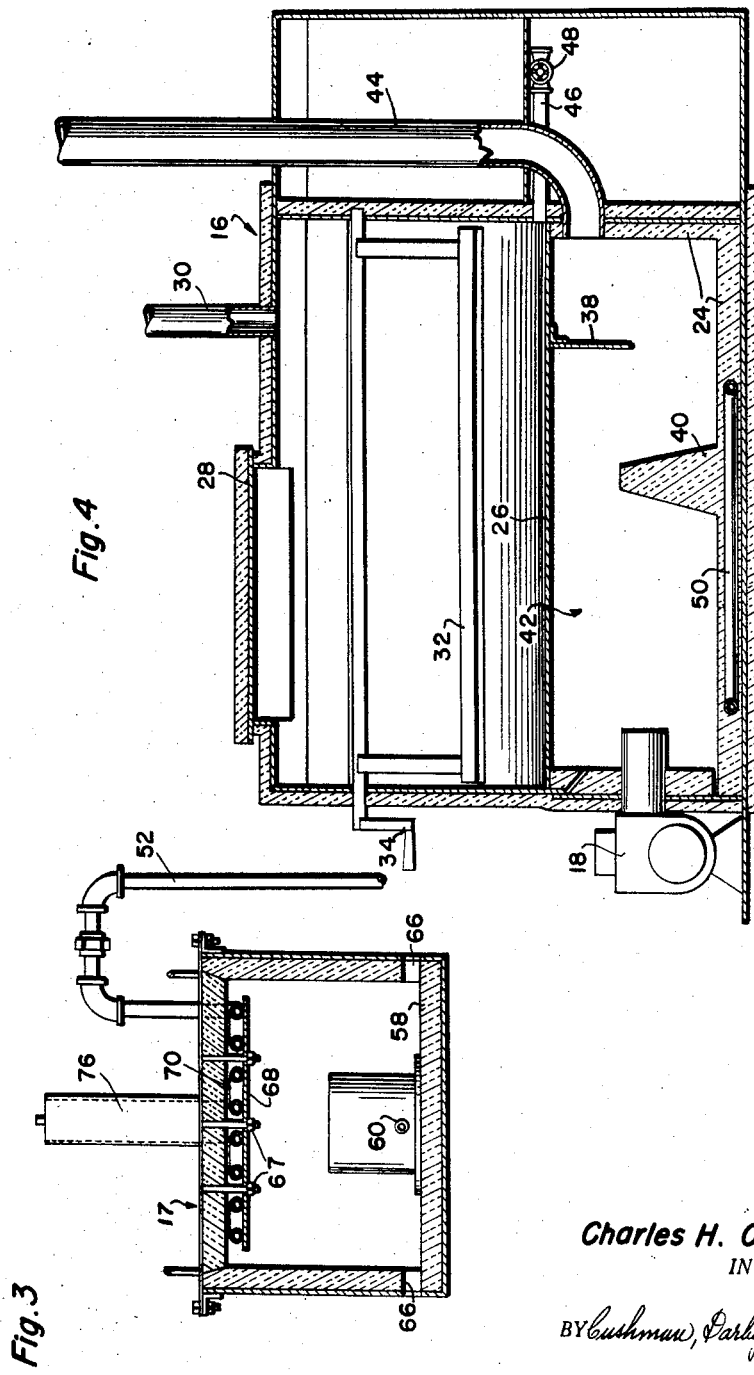

July 7, 1959
C. H. CALLERY
2,893,642
APPARATUS FOR APPLYING BITUMEN COATING TO METALLIC SURFACES
Filed Feb. 8, 1956
8 Sheets-Sheet 4
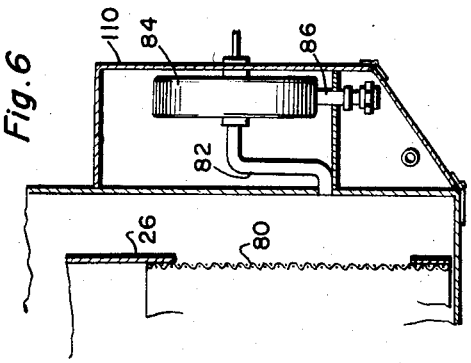
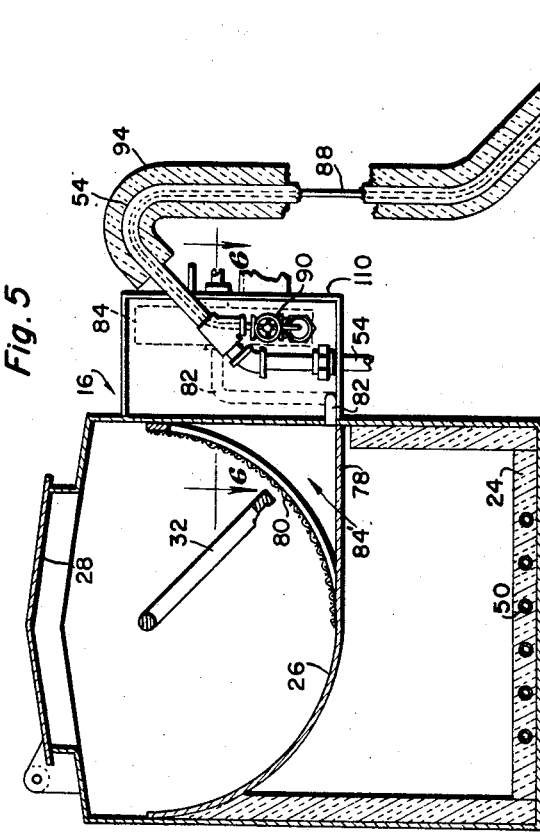
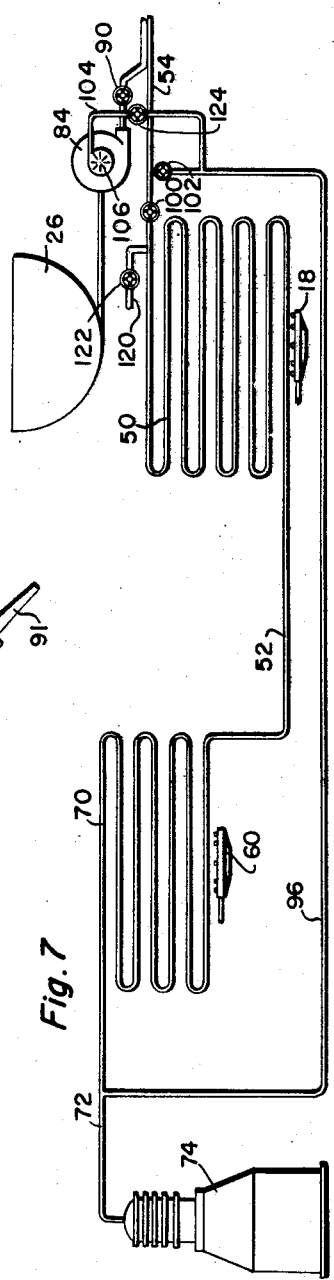
Charles H. Callery
INVENTOR.
BY Cushman, Darby & Cushman
Attorneys July 7, 1959

C. H. CALLERY 2,893,642

APPARATUS FOR APPLYING BITUMEN COATING TO METALLIC SURFACES

Filed Feb. 8, 1956

INVENTOR
CHARLES H. CALLERY

BY
Cushman, Darby & Cushman
ATTORNEYS

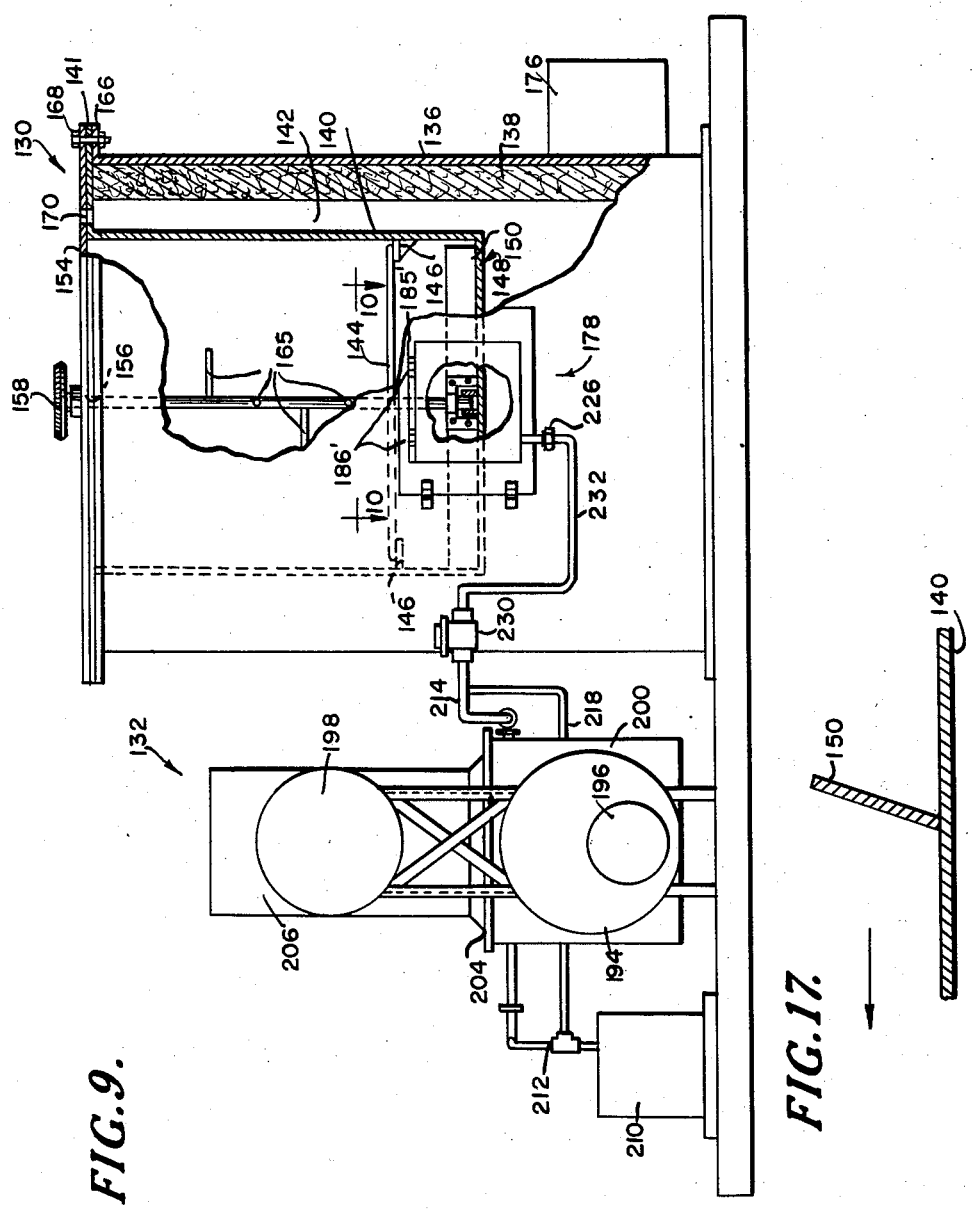

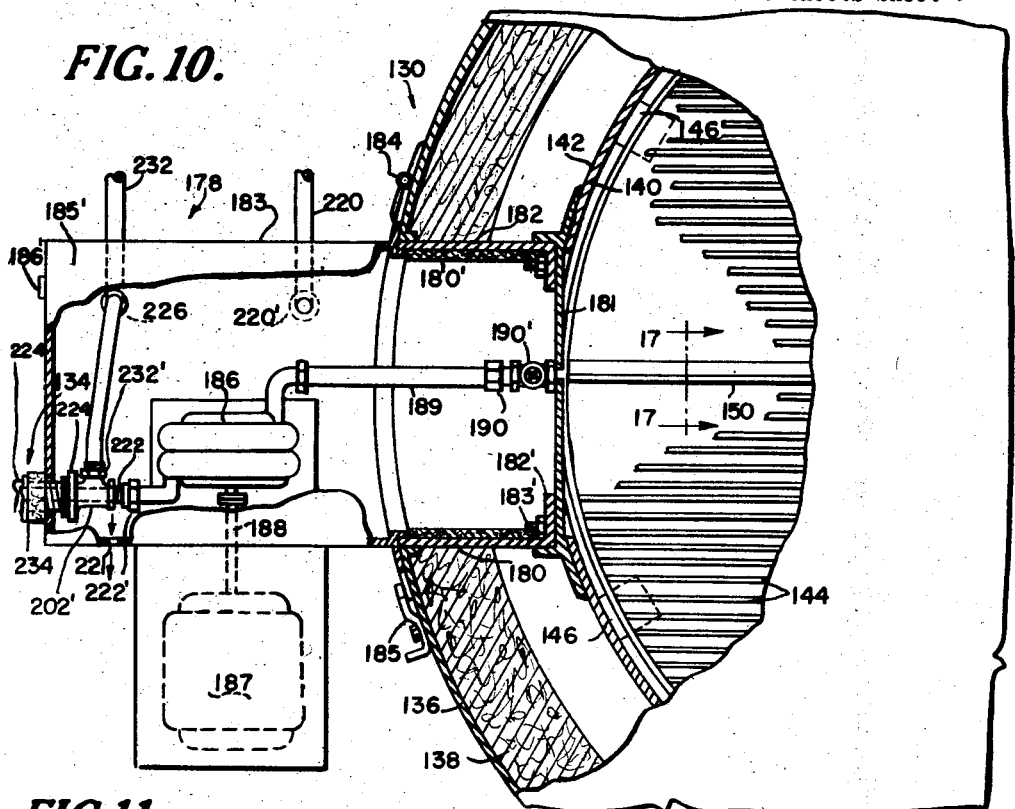

July 7, 1959 C. H. CALLERY 2,893,642
APPARATUS FOR APPLYING BITUMEN COATING TO METALLIC SURFACES
Filed Feb. 8, 1956 8 Sheets-Sheet 8

INVENTOR
CHARLES H. CALLERY

BY Cushman, Darby & Cushman
ATTORNEYS

United States Patent Office 2,893,642
Patented July 7, 1959

2,893,642

APPARATUS FOR APPLYING BITUMEN COATING TO METALLIC SURFACES

Charles Hylton Callery, New Orleans, La., assignor to American Anti Corrosion Corporation, New Orleans, La., a corporation of Louisiana Application February 8, 1956, Serial No. 564,156

3 Claims. (Cl. 239—132)

This invention relates to apparatus and method for applying protective coatings of high melting point materials. This application constitutes a continuation-in-part of my copending application Serial No. 473,401, filed December 6, 1954.

Bituminous materials or bitumens of high melting points have come into widespread use as a protective coating for oil and gas pipe lines as well as other installations. "Bitumastic" enamel made by the Koppers Company, Inc., is one example of such a coal-tar derivative material which must be applied at high temperatures. The great advantage of these and other materials, aside from their economical availability, resides in the many properties they possess which are favorably suited to this particular job. For example, such materials generally have high resistance to water, high electrical resistance, strong adhesion, high resistance to soil chemicals, high resistance to the solvent action of petroleum oils, relatively good resistance to mechanical damage, good stability under extreme temperature conditions, lasting ductility and elasticity, high resistance to internal change, and uniformity. The greatest disadvantage of these materials is that they are somewhat difficult to handle and must be applied at elevated temperatures.

For example, "Bitumastic" presently on the market must be applied at temperatures of the order of 375° F. to 490° F. This means that at average atmospheric temperatures, the material is in a solid state and must be softened or melted to its free flowing state within its particular high temperature range before application. Moreover, the application temperature for a particular material must be accurately controlled; otherwise, the properties of the material may be altered or handling becomes impossible; that is, if during application the material is allowed to cool below its application temperature range, it begins to harden, and, hence, will clog conduits and other parts of application apparatus. When the material is heated above its application temperature range, or for too long a period at such range, its more volatile components are driven off and "coking" results which renders the material useless for its intended purpose, let alone the attendant difficulty of cleaning the melting and application apparatus. In this connection, "Bitumastic" when solidified in bulk is not readily attacked by solvents, so that cleaning of application apparatus presents obvious problems. Furthermore, the material must be kept in motion substantially continuously during the melting of the same or it will stick, burn, or "coke" to the interior sides of the melting container.

Current practices in applying high melting point bitumen, for example, involve initially cleaning the surface to be coated, as by sand blasting, scraping, etc., applying a primer which may also be a coal-tar derivative, and then applying the bitumen coating. Usually the bitumen coating is subsequently wrapped and additional coatings and wraps may be applied, if desired, depending on the particular requirements of the job. Heretofore, high melting point bitumen coatings usually have been rubbed or brushed on by hand, after having been liquefied by heating to inaccurate temperatures in an open vessel and transferred to unheated containers, from which it is dipped and applied. Such practices unquestionably result in an inferior application and/or bond. Although some attempts have been made heretofore to develop satisfactory machines for applying coatings of such materials, such machines pumped the liquefied material in streams through non-atomizing orifices to merely flow the material onto the surface to be coated. Such a "flowing-on" of the coating does not form a good bond, with a consequent tendency of the coating to peel off readily.

With the above in mind, it is an object of the present invention to provide an improved melting, distributing, and spraying apparatus for applying high melting point coating products to surfaces and for forming a coating thereon that is firmly bonded thereto and free from any tendency to peel.

Another object of the present invention is the provision of apparatus for applying high melting point coating materials, such apparatus having improved means for accurately controlling the temperature of the coating material from its point of melting to its point of application, and for properly agitating the material to preclude hardening from settlement.

A still further object of the present invention is the provision of an improved method for spray coating surfaces with high melting point materials which results in a firm bond of the material to the coated surface.

Still another object of the present invention is the provision of an improved high melting point coating material furnace which is simple in construction, easy to operate, and can be readily disassembled for cleaning purposes.

A further object of the present invention is the provision of an improved hose assembly for applying high melting point coating materials, together with a nozzle for dispersing the discharge of the liquefied hot material into an atomized, fan-shaped spray for improved application.

Still another object of the present invention is in the provision of a novel melting and spraying apparatus which includes a melting furnace, a preheater, an air compressor for forcing air through heating coils in the preheater, and thence through further coils in the melting furnace, and thence through a further conduit wherein the heated air may be mixed with cool air to immediately and automatically adjust the temperature of the mixture prior to passing it in surrounding relation to the liquid conduit through which the melted material is to pass to its point of distribution and application.

A still further object of the present invention, ancillary to the preceding object, is in the provision of a novel cooperation between the air preheater and the melting furnace wherein once the melting furnace has reached its required temperature, the air heating furnace can be turned off and air will become heated by radiation from within the melting furnace.

These and other objects will become more apparent during the course of the detailed description and appended claims.

The invention may best be understood with reference to the drawings wherein an illustrative embodiment is shown.

In the drawings:

Figure 2 is a side elevational view of the melting furnace shown in Figure 1;

Figure 3 is a vertical sectional view through the fluid preheater taken substantially on line 3—3 of Figure 1;

Figure 4 is a longitudinal, vertical, sectional view of the melting furnace shown in Figure 1;

Figure 5 is a vertical, transverse, sectional view of the melting furnace shown in Figure 1;

Figure 6 is an enlarged, fragmentary, sectional view taken substantially on line 6—6 of Figure 5;

Figure 7 is a flow diagram of the fluid and liquid passage through the apparatus;

Figure 9 is a side elevational view of the apparatus shown in Figure 8, with parts broken away to more clearly illustrate the interior of the melting furnace;

Figure 10 is a fragmentary, cross-sectional view taken along the line 10—10 of Figure 9;

Figure 11 is a cross-sectional view taken along the line 11—11 of Figure 8;

Figure 12 is a cross-sectional view taken along the line 12—12 of Figure 8;

Figure 17 is an enlarged, fragmentary, sectional view taken on lines 17—17 of Figure 10.

Figure 1:
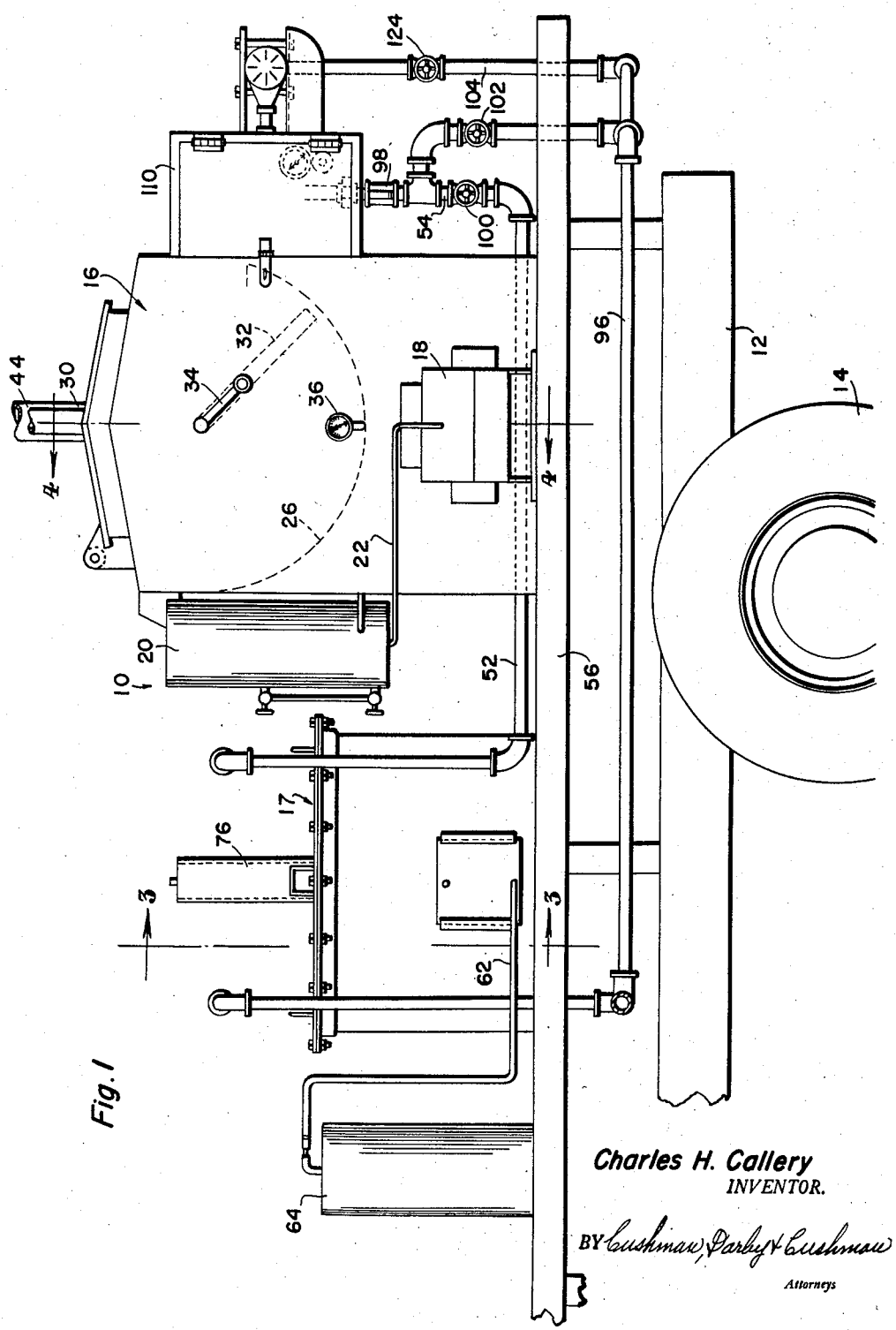
Figure 1 is an end elevational view of a mobile melting and liquid distributing apparatus embodying the present invention mounted on a suitable mobile frame.

Referring now to Figures 1–7 of the drawings, there is shown a mobile melting and distributing apparatus, indicated in entirety at 10, embodying certain principles of the present invention. The apparatus preferably is portable, and for that purpose is shown as being mounted on a suitable vehicle frame 12 supported by wheels 14.

The melting and distributing apparatus 10 essentially comprises a melting furnace 16 and fluid preheater 17. To heat the melting furnace 16, a burner 18 opens into the furnace intermediate the top and bottom thereof, and a suitable fuel supply tank 20 mounted on the side of the furnace supplies fuel to the burner 18 through the fuel line 22.

Noting particularly Figures 4 and 5, it will be seen that the melting furnace 16 essentially comprises a rectangular housing suitably insulated throughout the side walls, top, and bottom thereof by means of insulating panels 24. Within the upper portion of the furnace 16 is disposed a heating kettle 26. Cover 28 on top of the furnace 16 normally covers an opening through which cold coating material to be melted is fed to the heating kettle 26. Vent pipe 30 opening into the top of the furnace 16 serves as means for releasing volatilized materials from the kettle 26.

To agitate the material to be melted within the melting kettle 26, a suitable agitating blade or paddle 32 is provided, as shown in dotted outline in Figure 1, which is adapted to be manually swung within the melting kettle 26 by means of the handle 34 disposed exteriorly of the furnace. Conveniently, also as shown in Figure 1, a suitable temperature gauge 36 may be provided on the front of the housing connected to a suitable temperature-responsive element within the heating kettle to gauge the temperature of the material to be melted.

Baffles 38 and 40 suspended from the bottom of the heating kettle 26 and extending upwardly from the insulated floor panel 24 of the furnace, respectively, are provided in the heating chamber 42 thereof, into which the burner 18 opens. Flue 44 opens into the back of the heating chamber 42 and extends upwardly from the furnace. To drain the melting kettle 26, a suitable drain line 46 opens into the back thereof, and has a drain valve or drain coupling valve 48 on its end disposed exteriorly of the furnace proper.

Embedded within the bottom insulating panel 24 of the melting furnace 16 are a series of interconnected tubular fluid heat exchange coils 50, which coils communicate at one end thereof with a first fluid conduit 52 leading from a fluid preheater 17 and at their other end with a second fluid conduit 54, the purpose of which will later become apparent.

The fluid preheater 17 essentially consists of a rectangular casing mounted on the platform 56, which casing is insulated throughout with suitable insulating panels 58. Opening into the lower portion of the preheater 17 is a suitable burner 60 supplied through fuel line 62 from the fuel supply tank 64. Draft openings 66 opening into the interior of the furnace adjacent the bottom thereof supply sufficient air to maintain combustion within the preheater 17.

Suspended by a plurality of bolts 67 depending from the top of the heater 17 into the interior thereof is a flat, horizontally-disposed plate 68 upon which rests a series of fluid heating coils 70, one end of these coils communicating with the fluid conduit 52 and the other end of these coils communicating by means of a suitable conduit 72 with an air compressor 74, note Figure 7, which normally pumps air under pressure through the fluid heating coils 70, conduit 52, and heat exchange coils 50, and thence through conduit 54. Stack 76 opening into the top of the preheater permits the release of combustion gases therefrom.

The melting kettle 26 within the furnace 16 essentially comprises a trough-shaped affair with one wall 78 thereof extending tangentially from the kettle bottom toward a side of the furnace 16 as shown in Figure 5, such wall 78 serving as a collecting platform for melted material. Arcuate screen 80 formed in the kettle bottom permits the passage of melted material onto the surface of the collecting platform 78. A conduit 82 opens at one end thereof immediately above the platform 78 through a side wall of the furnace 16 into the bottom of the melted material chamber 84' formed between the screened bottom 80 of the melting kettle 26 and the collecting platform 78, the other end of this conduit 82, as will be noted particularly in Figure 6, being connected to the inlet side of a suitable liquid pump 84. From the outlet side of the pump 84 there extends a discharge conduit 86 (Figure 6) for conducting melted material from the pump 84 to a melted liquid distributing hose or conduit 88 having a nozzle 91 on the end thereof for spraying the melted liquid as it passes therefrom. A suitable valve coupling 90 is provided between the outlet conduit 86 and the material distributing conduit 88 whereby, by proper manipulation of the valve, the pressure and flow rate of melted liquid through the conduit 88 may be effectively controlled.

As will be noted from an examination of Figure 5, the melted material distributing conduit 88 extends concentrically within the fluid conduit 54 so that the preheated air therewithin may serve to maintain the liquid in its melted condition until being sprayed through the nozzle 91.

The conduit 54 terminates short of the nozzle 91, and the nozzle is provided with a baffle 92 whereby the hot air emanating from the free end of the conduit 54 may be disseminated into the atmosphere. Preferably, a considerable length of the end portion of the fluid conduit 54 and of the melted material conducting conduit 88 are rendered flexible for ease of manipulation in the spraying procedure. Further, a suitable insulating jacket 94 is provided on the exteriorly projecting portions of the conduit 54 to reduce heat loss through radiation. Similarly, all other exposed heated pipes and conduits are likewise siutably insulated throughout the apparatus.

In order to regulate the temperature of the fluid passing through the hot air conduit 54, a cool air conduit 96 is provided leading directly from the compressor conduit 72 and by-passing the fluid coils 50 and 70, thence opening directly into the fluid conduit 54. On the conduit 54, above the connection or coupling of the conduit 96 thereto, is a suitable valve 98 to control the rate of flow of the mixture through conduit 54, while valves 100 and 102 are used to regulate the temperature of the mixture flowing to the valve 98.

A by-pass fluid line 104 leads from the fluid conduit 96 to a suitable air motor 106 which drives the previously mentioned liquid pump 84.

For convenience, the pump 84, and liquid connection couplings of the conduits 82, 86, and 88 with the pump and the conduit 54 are disposed in a suitable housing 110 at the side of the furnace. Access door 112 in the housing 110 provides easy access to most of these valve connections and also provides access to gauge 114 on the conduit 86 for measuring the pressure of the liquid entering the distributing conduit 88.

Inasmuch as the heated fluid passing through the conduit 54 may at times exceed the pressure desired thereon, a suitable gauge 116 is mounted thereon to measure the mixture pressure of the hot fluid through the line 54 and the cooler fluid entering through the line 96. In the event the pressure is too great, or it is desired to relieve the pressure from the hot air system coils 50 and 70, the line 54 is provided with a drain line 120 having a drain valve 122 thereon.

To control the fluid to the air motor 106, the bypass line 104 from the fluid line 96 is provided with a suitable regulating valve 124.

The apparatus is capable of exceedingly sensitive temperature adjustments arrived at by the manual mixing or blending of air from hot and cold supply lines through mixing valves 100 and 102. This immediately obtainable blend of fluids can be varied in a matter of seconds from atmospheric temperature to 1000° F. and back to atmospheric temperature. Naturally, this insures critical accuracy in controlling and maintaining a specifically-desired temperature of the coating product being applied.

The apparatus has found particular utility in spraying "Bitumastic" material or enamel of higher melting point values.

In this use, cold compressed air at a pressure of from 75 to 120 pounds enters the heating coils 70 in the preheater 17 and is thence carried through the conduit 52 to the coils 50 buried in the insulation 24 in the bottom of the furnace 16. Hot air comes from these coils 50 at a temperature between 400° and 1000° F., depending on the extent of fire desired and maintained in the air heater and heating kettle, which fire will of course depend upon the particular material being melted. This hot air passing through the line 54 from the coils 50 is then mixed with cold compressed air coming through the line 96 to provide a temperature of from 450° F. to 650° F. for the mixture in its passage concentrically about the material distributing hose 88. This hot air in the space between the flexible hose portions 54 and 88 maintains the heat within the hose 88 at the required application temperature up to the tip of the spraying nozzle to assure maximum operating efficiency for the apparatus.

In Figures 8 to 16 of the drawings, there is shown a preferred modified form of the apparatus which embodies a coating material melting furnace 130, an air heating furnace 132, and a hose assembly 134. It will be understood that the furnaces 130 and 132 may be suitably mounted on a vehicle frame in the manner indicated in Figures 1 to 7, although the same is not shown. The material melting furnace 130 comprises an upright, cylindrical housing 136 having its inner surface provided with suitable refractory material 138. A cylindrical melting kettle 140 is suitably removably supported on the upper edge of the housing 136 and depends therewithin in spaced relation to the material 138 so as to provide a surrounding air chamber or jacket 142. For this purpose, the upper end of the kettle 140 may have an exterior peripheral flange 141 resting on a similar flange 166 on the furnace housing 136 and secured thereto by bolts 168. The kettle 140 is provided with a screen 144 supported above the bottom thereof by means of circumferentially spaced lugs 146. As best shown in Figures 9 and 10, the outer periphery of the screen 144 is spaced inwardly from the interior peripheral wall of the kettle 140 so as to permit coating material melting from solid chunks resting on the screen to flow down the walls of the kettle to the bottom thereof without interference from the screen.

Disposed within the bottom of the kettle 140 is an agitator or stirrer, generally indicated at 148, which includes four radially extending blades 150 that rest on the bottom of the kettle to scrape the same. The blades 150 are detachably connected, at their inner ends to appropriate brackets on the lower end of a vertical agitator shaft 152 having its lower end rotatably journaled in a bearing 153 secured centrally to the inner side of the kettle bottom. As best shown in Figures 9 and 17, the blades are vertically elongated in radial section and inclined rearwardly relative to their direction of rotation to thus lift as well as stir the molten material in the kettle. It also will be noted that the outer ends of the blades 150 sweep closely adjacent the side walls of the kettle.

Figure 8:
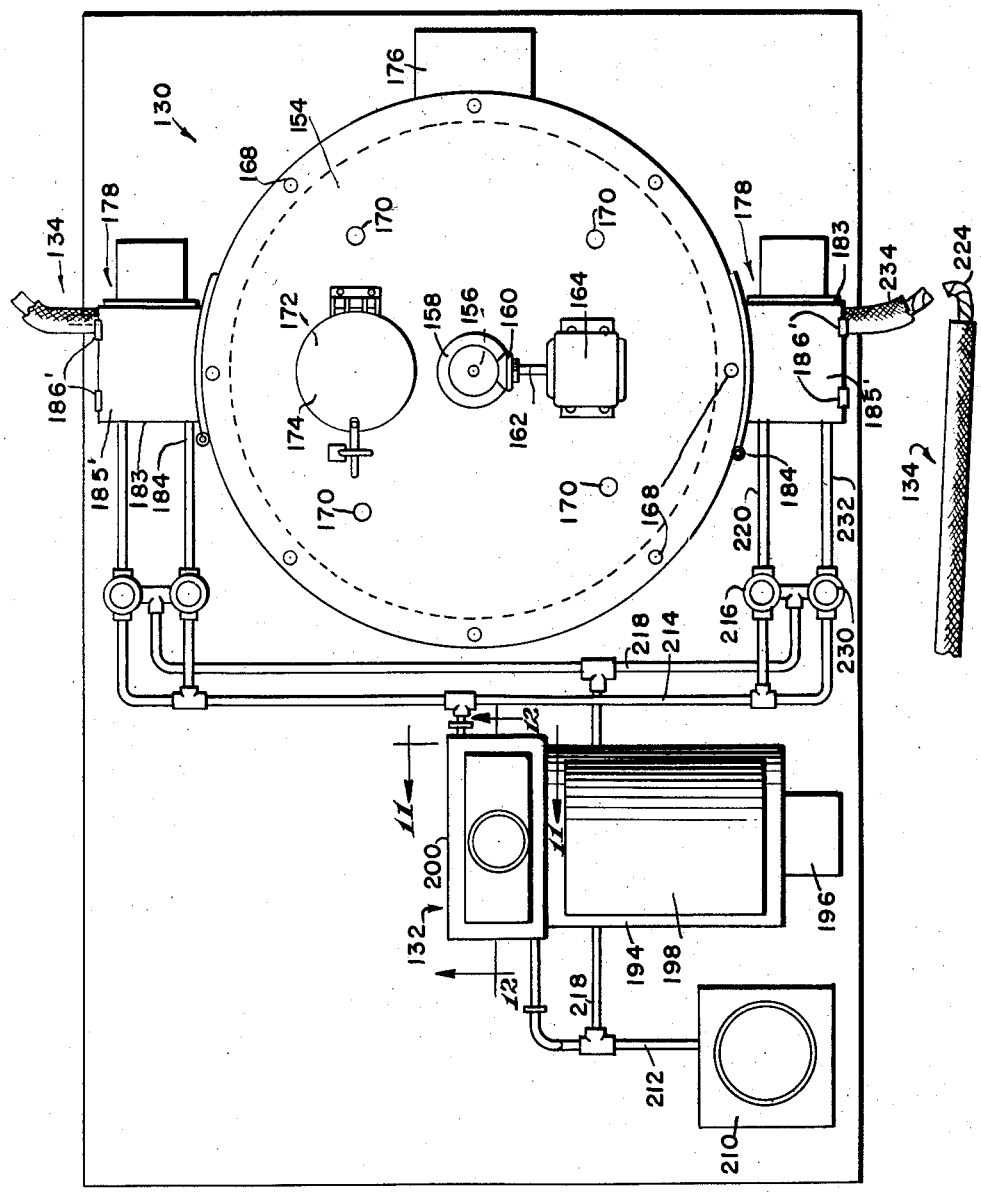
Figure 8 is a top plan view of a modified form of apparatus constructed in accordance with the principles of the present invention.
Figure 13:
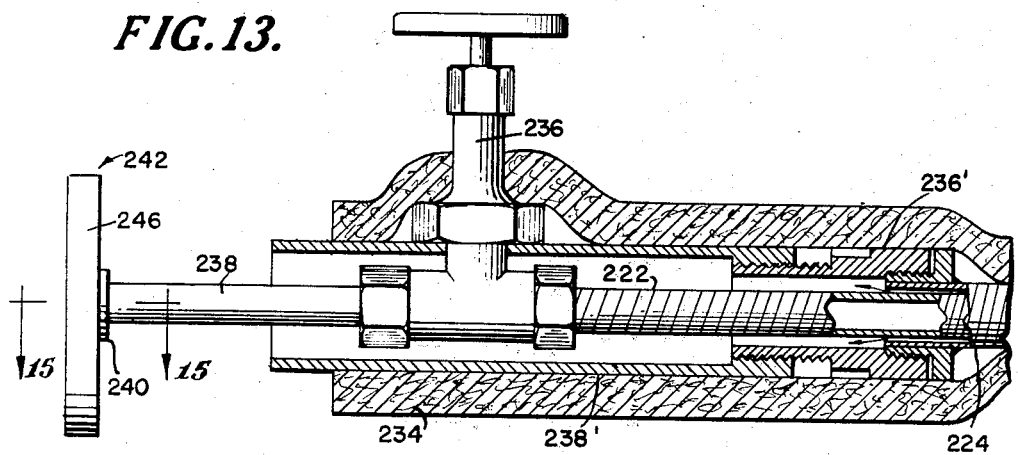
Figure 13 is a side elevational view of a spray coating nozzle, embodying this invention, with parts broken away for clearer illustration.

A cover or lid 154 detachably closes the upper end of the kettle 140 and has a central aperture 156 journally receiving the upper end of the shaft 152 which projects through the lid aperture 156 and has a bevel gear 158 mounted thereon. The gear 158 meshes with a cooperating bevel gear 160 mounted on an output shaft 162 of an appropriate agitator motor 164 suitably mounted on the cover 154. Preferably, a plurality of radial fingers 165 are mounted on the shaft 152 above the screen for stirring unmelted chunks of coating material disposed thereon. As best shown in Figure 8, the lid or cover 154 is circular in configuration and is arranged to be detachably secured to the kettle by the bolts 168. The lid 154 and kettle flange 141 have vent holes 170 communicating with the air chamber 142, while the lid also has an access opening 172 through which chunks of solid coating material may be fed into the kettle. This access opening may be closed by a suitable removable closure member 174 or the like.

Mounted within the housing 136 below the kettle 140 and freely communicating with the air chamber 142 is a burner 176 which may be of any suitable construction. This burner is schematically illustrated in Figure 8 as comprising an oil burner, but it will be understood that other types of appropriate burners may be utilized, if desired.

In order to remove the molten material which collects in the bottom of the kettle and distribute it to a point of application, there is provided a pump assembly 178 which may be mounted on the outer surface of the housing 136. As shown, two such pump assemblies 178 are mounted in diametrically opposed relation on the housing wall, but it will, of course, be understood that only one or more than two may be provided, if desired. Since the pump assemblies 178, as shown, are identical in construction, except insofar as they are modified to accommodate different positions on the furnace, a description of one will suffice to give an understanding of both.

The furnace housing 136 includes a radial opening 180 which also extends through the refractory 138 at a position adjacent the bottom of the kettle 140. A flat plate 181 is rigidly secured, as by welding, over a suitable aperture formed in the wall of the kettle opposite the opening 180 and a pump housing sleeve section 182, lined with heat insulating material 180', is removably disposed within the opening in engagement with the plate 181. At its inner end the section 182 has an inturned flange 182' apertured in registration with and receiving studs 183' secured to the plate 181 for bolting the section to the plate. A second pump housing section 183 is pivoted, as at 184, to the exterior of the furnace housing 136 for movement between a closed position wherein the two sections 182 and 183 form a closed housing and an open position wherein exterior access to the housing 182 may be had. The section 183 may be maintained in its closed position by any suitable means, such as latch 185, and also has a removable lid 185' provided with hinges 186'. Mounted within the housing section 183 is a pump 186 which may be driven by any suitable means, such as a motor 187, mounted on the exterior of the housing section 183 and drivingly connected with the pump, as by shaft 188. The inlet side of the pump 186 has one end of an elongated horizontal suction conduit 189 connected therewith and the other end of the conduit is connected to a short valve 190' by a union 190. The valve 190' is connected directly to a discharge opening in the plate 181 at the kettle bottom so as to communicate with the bottom interior of the kettle.

It will be seen that connection of the valve 190' with the pipe 189 serves to communicate the pump 186 with the bottom of the kettle. Furthermore, the above construction readily permits access to the pump 186 for cleaning purposes as well as facilitating removal of the kettle 140 for like purposes. Thus, the lid 185' can be lifted to close the valve 190' and uncouple the union 190 so that the housing section 183 can be swung open. Thereupon, the housing sleeve section 182 can be slid out of the opening 180, after unbolting the studs 183', to permit the kettle 140 to be lifted upwardly out of the furnace after being unbolted therefrom.

It will be seen that the pump housing section 182 shields the suction conduit 189 from the direct heat of the furnace 130 to thereby prevent overheating of melted coating materials passing therethrough. Furthermore, the housing sections 182 and 183 provided an enclosed area about the suction line 189, valve 190', pump 186, and the discharge connections to the latter, which can be maintained at an appropriate temperature to prevent overheating or cooling of the liquefied coating material in its passage from the kettle 140 through the pump 186.

For maintaining the above enclosing area at a desired temperature, the air furnace 132 is provided. This furnace 132 comprises a cylindrical insulated furnace housing 194 having a burner 196 of any suitable construction directed into one end thereof. As shown, the burner is of the swirl type which fires oil, and hence fuel oil storage tank 198 is shown mounted above the furnace housing. The rear end of the furnace housing 194 communicates with a rectangular housing 200 within which is mounted a series of looped heat-exchange pipes 202. The top of the rectangular housing 200 is closed by a removable cover 204 embodying stack 206. Preferably, the pipes 202 are suspended from the cover 204, as by brackets 208, for removal with the cover. An air compressor 210 supplies air to the pipes 202 through a pipe 212. The burner can be adjusted to maintain a temperature within the rear housing 200 up to approximately 1200° F., to thereby raise the temperature of the compressed air within the pipes 202 as required up to approximately 1000° F. A pipe 214 conducts the compressed hot air from the pipes 202 to a mixing valve 216 which is also supplied with cool air by a by-pass line 218 leading directly from the compressor 210. The mixing valve 216 may be manually or preferably thermostatically controlled so as to obtain any desired mixture of hot and cold air and thus supply air in any desired temperature range to an outlet pipe 220 connected to the mixing valve 216 for discharge into the pump housing section 182. The hot air thus introduced within the pump housing may be discharged therefrom through a suitable vent hole 221 formed therein. Preferably a union 220' is incorporated in the pipe 220 for uncoupling when the housing section 182 is to be swung open.

The discharge side of the pump 186 is connected directly to a conduit 222, by a union 222', with the conduit extending through the smaller end of an enlarging T or Y fitting 202' and forming a part of a hose assembly 134. Connected to the larger end of the fitting 202' by a union 224' is a larger flexible conduit 224 surounding the inner conduit 222. Outside the pump housing, the outer conduit preferably is provided with a jacket 234 of appropriate heat insulating material, and both conduits 222 and 224 are of metallic construction having heat-resistant liquid-impervious linings so that the hose assembly 134 is capable of withstanding pressures of the order of 750 p.s.i. and temperatures of the order of 1000° F.

The space between the two conduits 222 and 224 is supplied with hot air via a pipe 232, connected to the lateral inlet of the fitting 202' by a union 232' and leading from another mixing valve 230 which is also preferably controlled and supplied with hot and cold air from the pipes 214 and 218. Desirably, the pipe 232 also has a union 226 therein for the same reason set forth above for the union 220'. The hose assembly may be of any suitable length; it has been found that 25 to 50 feet is desirable.

Figure 14:
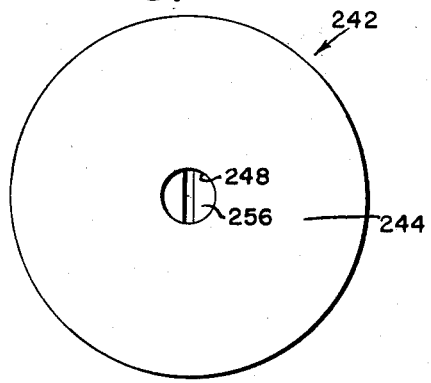
Figure 14 is a front elevational view of the spray nozzle shown in Figure 13.
Figure 15:
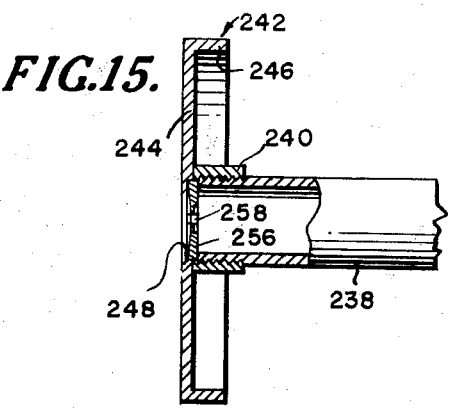
Figure 15 is a cross-sectional view taken along the line 15—15 of Figure 14.

Connected directly to the discharge end of the inner conduit 222 is a valve 236 of any suitable construction for controlling the discharge of the melted material. In actual practice it has been found that a gate valve provides excellent results. A short pipe 238 has one end threadedly connected to the valve 236 and its opposite end threaded into a sleeve element 240 formed on a baffle member, generally indicated at 242. As best shown in Figures 14 and 15, the baffle member 242 comprises a circular disk 244 having the sleeve element 240 rigidly and coaxially secured to the rear face thereof and having a peripheral flange 246 extending longitudinally rearwardly thereof. A central opening 248 of smaller inner diameter than the sleeve element 240 is formed in the disk and is counterbored at its rearward end for the reception of a disk-shaped nozzle element or orifice plate 256 which is retained in position by the pipe 238.

Figure 16:
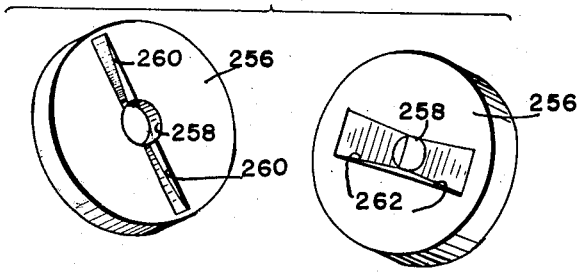
Figure 16 is a perspective view illustrating both surfaces of the nozzle element.

As best shown in Figure 16, the nozzle element 256 has a central orifice 258 and a pair of diametric grooves 260 and 262 disposed on its opposite faces and centrally intersecting the orifice 258. The grooves 260 and 262 are deepest adjacent the orifice 258 and diminish in depth toward their outer extremities. Preferably the grooves 262 which are disposed on the inner face of the element 256 taper in width toward the orifice 258. It has been found that the nozzle element 256 as described above is particularly advantageous in forming an atomized, fan-shaped spray which greatly facilitates the application of high melting point coating materials.

The outer conduit 224 of the hose assembly terminates short of the valve 236 and is connected, by an appropriate fitting 236', to a rigid sleeve member 238' which extends forwardly and concentrically about the inner conduit 222, the body of the valve 236, and the pipe 238 to form an annular space surrounding the aforesaid parts. The sleeve member 238' terminates short of the baffle member 242 so as to discharge thereagainst the hot air forced through the conduit 224 and through the above-mentioned annular space. It will be seen that the handle of the valve 236 is disposed exteriorly of the sleeve 238' and the heat insulating jacket 234, which is continued forward over the sleeve.

In operation of the apparatus shown in Figures 8 to 16 and using bitumen as an exemplary coating material, chunks of solid bitumen are fed in through the access opening 172 in the furnace lid 154 and fall onto the screen 144 inside the kettle 140. As the burner 176 heats the solid bitumen, the same is softened or melted and runs down through the screen into the bottom of the kettle. It will be noted that by disposing the periphery of the screen inwardly of the kettle walls, molten bitumen adhering thereto may run down into the kettle bottom substantially unobstructed. The molten bitumen which collects at the bottom of the kettle is maintained at the proper temperature (of, for instance, 475° F. or higher) by virtue of the burner and the hot gases contained within the surrounding air chamber 142. While the heating of the solid bitumen is taking place, motor 164 is actuated to rotate the agitator blades which scrape the bottom of the kettle. This agitation insures that the kettle bottom will not become burned and that no localized overheating of the bitumen will occur which might result in "coking."

An important aspect of this embodiment of the present invention is the manner in which the temperature of the molten material is accurately controlled after it leaves the kettle bottom to the point of application. The air mixing valve arrangements provide a simple but accurate and effective way to supply a variable heat source to maintain the material substantially exactly at its desired high temperature. The hot air from the air furnace 132 is maintained in surrounding relation with the material at all times after the same leaves the kettle. Pump 186 draws the molten material from the kettle bottom through conduit 189, and with the present pump housing arrangement a surrounding jacket of hot air is maintained around the conduit 189 as well as the pump 186. This latter relationship is particularly important, since an unheated pump may result in local cooling of the product below its desired operating temperature, while an overheated pump will result in "coking" of the material and probable damage to the pump. Preferably, the pump is of sufficient capacity to maintain a pressure of at least 200 p.s.i. just rearwardly of the spray orifice 258.

After the hot material passes through the pump 186 it is forced through the inner conduit 222 of the hose assembly 134. Here also a surrounding jacket of hot air of controlled temperature is maintained around the molten material. Finally, as the hot material passes through the valve 236 and out of the spray orifice 258, the orifice plate 256 is maintained at the proper temperature by means of the hot air discharge impinging on the baffle member 242 which is of relatively large mass so as to retain its heat. This baffle member 242 also serves to prevent the hot air discharge from mixing with the spray of coating material and possibly forming highly undesirable air bubbles in the coating. Additionally, the baffle member 242 prevents the hot air discharge from impinging on the coating which would prevent rapid set-up and cooling and would cause undesirable ripples and pockets in the coating. It also is to be noted that by removing baffle disk 244 and closing the valve 236, a stream of hot air is readily available to dry the surface to be coated, if necessary. In this manner, the present apparatus may be utilized to coat surfaces in humid weather by merely drying the surface to be coated with hot air before applying the coating. As previously stated, the pump is arranged to develop a pressure of the order of at least 200 p.s.i. within the nozzle pipe 238, so that as the hot coating material issues from the nozzle orifice, it will be dispersed into an atomized spray. The particular configuration of the nozzle orifice 258 and associated grooves 260 and 262 spreads this atomized spray into a fan-shaped configuration which is particularly easy to work with. Preferably, the end of the nozzle is maintained approximately six inches from the surface to be coated, although it can be more or less.

It has been found that the coating applied in the manner indicated above forms an extremely firm bond which is not subject to peeling. In fact, coatings applied in accordance with the present invention adhere to the coated surface so strongly that it is necessary to scrape or chip to remove them. It is believed that this strong bond results from the atomizing of the spray and the extremely accurate control of the product temperature which is maintained up until the time the product passes through the nozzle orifice. Since the initial amount of hot product which contacts the surface to be coated comes in an atomized spray rather than a stream, it can more readily conform to the minute surface indentations and depressions and surface mounds and projections. By the same token, the coating can be applied more readily with a uniform thickness while its surface is very smooth and adheres extremely well to any wraps that may be subsequently applied. Moreover, the precise control of the bitumen (or other coating material) temperature presents the same to a clean surface to be coated at an optimum application temperature. Of course, the atomization of the hot coating material through the nozzle is dependent upon the proper control of the temperature of the material and with the accurate control features of the present invention atomization is made possible.

Another feature of the present embodiment which makes this accurate high temperature control of the coating material possible is the construction of the pump housings on the melting furnace. It will be understood that if material in the line leading from the furnace bottom to the pump should be subjected to the heat caused by burner 176 within the air jacket 142, the same would soon "coke" and clog the discharge from the kettle. To positively prevent this occurrence, the discharge line as well as the pump itself is surrounded with a temperature controlling air blanket. The pump housing which is provided to perform this function is arranged to permit ready removal of the kettle. In handling bitumen, it is important to clean the kettle frequently, and with the present arrangement, this can be accomplished easily after the removal of the kettle from the furnace housing. Removal of the kettle may be readily effected by merely disconnecting the lid 154 and then unloosening the union fitting 190 from the pipe 189. It will be noted that the housing section 183 may be pivoted into its open position after opening latch 185. Access to the fitting 190 and the studs 183' is easily gained through the housing lid 185' and unloosening of the fitting and studs also serves to release the housing section 182 so that it can be removed from the opening 180. In this manner, the kettle is readily removable for cleaning, and the subsequent replacing of the kettle back into the furnace housing may be accomplished with equal facility.

The hose assembly, as shown, is particularly adapted for manual manipulation. The present invention is readily adaptable to be modified, however, in various manners. For instance, it is within the contemplation of the present invention to mount the nozzle on an annular frame so that as the latter is moved along a pipe line, the nozzle or nozzles will be positioned to coat the surface thereof.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A hose assembly for spray-applying a coating of high-melting point material comprising: an inner flexible conduit for conveying hot liquefied materials; an outer flexible conduit of greater diameter surrounding said inner conduit so as to form a longitudinal passageway between said conduits for receiving hot air; a discharge nozzle connected to one end of said inner conduit and having a pressure-atomizing spray orifice, said outer conduit terminating short of said orifice to form a forwardly-facing, annular outlet for said passageway; and a baffle member extending generally radially outwardly from said nozzle in position to be impacted by the entire blast of hot air discharging from said outlet, whereby said nozzle is heated and the hot air is dispersed and prevented from mixing with the spray from said orifice or impinging on a coating being formed by said spray.

2. The hose assembly defined in claim 1 wherein the baffle member comprises a disk having a rearwardly extending peripheral flange.

3. In an apparatus for applying a coating of high melting point material, an outer conduit, an inner conduit for conveying hot liquified materials disposed within said outer conduit in spaced relation thereto so as to form a passageway therebetween for receiving a heated fluid, said inner conduit extending outwardly beyond one end of said outer conduit and having a discharge nozzle connected thereto, said discharge nozzle having a pressure-atomizing spray orifice therein, and baffle-like means extending generally radially outwardly from the end of said inner conduit adjacent said nozzle in a position to maintain the heated fluid issuing from the end of said outer conduit out of contact with the heated material issuing from said pressure atomizing spray orifice.

References Cited in the file of this patent

UNITED STATES PATENTS

| | | | |
|---|---|---|---|
| 364,101 | Gill et al. | May 31, | 1887 |
| 702,375 | Nichols | June 10, | 1902 |
| 1,170,699 | Stoffel | Feb. 8, | 1916 |
| 1,972,001 | Witham et al. | Aug. 28, | 1934 |
| 2,145,027 | McGrew | Jan. 24, | 1939 |
| 2,308,733 | McK. White | Jan. 19, | 1943 |
| 2,496,113 | Wollner | Jan. 31, | 1950 |
| 2,532,995 | Chausse | Dec. 5, | 1950 |
| 2,636,834 | Myers | Apr. 28, | 1953 |
| 2,644,717 | Kopperschmidt | July 7, | 1953 |
| 2,658,796 | Kopperschmidt | Nov. 10, | 1953 |
| 2,665,946 | Broughton | Jan. 12, | 1954 |
| 2,676,843 | Parsons et al. | Apr. 27, | 1954 |
| 2,686,695 | Kelly et al. | Aug. 17, | 1954 |
| 2,690,172 | Miller | Sept. 28, | 1954 |
| 2,710,229 | Patterson | June 7, | 1955 |
| 2,712,961 | Richardson | July 12, | 1955 |
| 2,714,528 | Keiser | Aug. 2, | 1955 |